(12) United States Patent
Dirner et al.

(10) Patent No.: US 10,599,587 B2
(45) Date of Patent: Mar. 24, 2020

(54) HIGH LATENCY CHANNEL AND LOW LATENCY CHANNEL

(71) Applicant: The Government of the United States, as represented by the Secretary of the Army, Washington, DC (US)

(72) Inventors: Jason Dirner, Bel Air, MD (US); Benjamin Peddicord, Perryville, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 53 days.

(21) Appl. No.: 15/362,938

(22) Filed: Nov. 29, 2016

(65) Prior Publication Data
US 2018/0150410 A1 May 31, 2018

(51) Int. Cl.
| | |
|---|---|
| *G06F 12/14* | (2006.01) |
| *H04L 9/08* | (2006.01) |
| *H04L 29/06* | (2006.01) |
| *G06F 21/60* | (2013.01) |
| *H04L 9/14* | (2006.01) |
| *H04L 9/32* | (2006.01) |

(52) U.S. Cl.
CPC ........ *G06F 12/1408* (2013.01); *G06F 21/606* (2013.01); *H04L 9/0816* (2013.01); *H04L 9/14* (2013.01); *H04L 9/3239* (2013.01); *H04L 63/0428* (2013.01); *H04L 63/062* (2013.01); *H04L 63/18* (2013.01); *G06F 21/602* (2013.01)

(58) Field of Classification Search
CPC ....... H04L 9/0827; H04L 9/0816; H04L 9/14; H04L 63/0428; H04L 63/062; H04L 63/18; H04L 9/3239; G06F 12/1408; G06F 21/606; G06F 21/602
See application file for complete search history.

(56) References Cited

U.S. PATENT DOCUMENTS

| | | | |
|---|---|---|---|
| 5,995,518 A | 11/1999 | Burns et al. | |
| 6,115,080 A | 9/2000 | Reitmeier | |
| 6,118,498 A | 9/2000 | Reitmeier | |
| 9,384,523 B1 | 7/2016 | Penner et al. | |
| 2011/0058674 A1* | 3/2011 | Campbell | H04W 12/02 380/270 |
| 2012/0063383 A1 | 3/2012 | Barbieri et al. | |
| 2013/0095770 A1 | 4/2013 | Moshfeghi | |
| 2013/0132625 A1 | 5/2013 | Hall | |
| 2014/0126613 A1 | 5/2014 | Zhang et al. | |
| 2014/0364164 A1 | 12/2014 | Griffin | |
| 2015/0010044 A1 | 1/2015 | Zhang et al. | |

(Continued)

*Primary Examiner* — Matthew T Henning
*Assistant Examiner* — Forrest L Carey
(74) *Attorney, Agent, or Firm* — Ronald Krosky; Azza Jayaprakash

(57) ABSTRACT

Various embodiments are described that relate to data set communication. Security information, such as a key list, can be generated and transmitted from a first node to a second node by way of a secure high throughput communication channel with high latency. The key list can be used to encrypt the data set and the encrypted data set can be sent to the second node by way of low latency signaling. The second node can decrypt the encrypted data set with the key list and perform a function that is indicated by the data set.

1 Claim, 10 Drawing Sheets

(56) References Cited

U.S. PATENT DOCUMENTS

| | | | |
|---|---|---|---|
| 2015/0149776 A1* | 5/2015 | Chastain | H04L 63/0869 |
| | | | 713/169 |
| 2015/0229339 A1 | 8/2015 | Reinart | |
| 2015/0309958 A1 | 10/2015 | Hall | |
| 2015/0318905 A1 | 11/2015 | Moshfeghi | |
| 2016/0034878 A1* | 2/2016 | Bak | G06Q 20/3226 |
| | | | 705/21 |
| 2017/0070890 A1* | 3/2017 | Luff | H04W 4/70 |
| 2017/0346798 A1* | 11/2017 | Yu | H04W 12/04 |
| 2017/0357523 A1* | 12/2017 | Benson | G06F 9/44505 |
| 2018/0137147 A1* | 5/2018 | Abson | G06F 17/30598 |
| 2018/0225230 A1* | 8/2018 | Litichever | G06F 21/56 |

\* cited by examiner

HIGH LATENCY CHANNEL AND LOW LATENCY CHANNEL

GOVERNMENT INTEREST

The innovation described herein may be manufactured, used, imported, sold, and licensed by or for the Government of the United States of America without the payment of any royalty thereon or therefor.

BACKGROUND

Digital information can be transmitted from a first location to a second location. In one example, the digital information can be an instruction for an action to be performed at the second location. If the digital information is tampered with during transit, then an incorrect action can occur at the second location. Depending on the incorrect action, this result can have dire consequences. Therefore, it can be desirable to securely transmit the digital information.

SUMMARY

In one embodiment, a method can be performed by a processor that is part of a first communication node. The method can comprise generating a key list for a payload and causing the key list to be sent to a second communication node along a first communication channel with a first security level. A data set that comprises the payload can be encrypted in accordance with the key list. The data set, when encrypted, can be sent to the second communication node along a second communication channel with a second security level. Latency of the key list when sent along the first communication channel to the second communication node can be at a first latency level and latency of the data set when sent along the second communication channel to the second communication node can be at a second latency level. The first latency level can be higher than the second latency level.

In another embodiment, a method can be performed by a processor that is part of a communication node. The method can comprise decrypting a payload and a hash by way of a key list and performing a verification of the payload by way of the hash. The can be received from a sender of the payload, at the communication node, by way of a high latency communication channel. The payload and the hash can be received, at the communication node, by way of a low latency communication channel. Upon reception, the payload and the hash can be encrypted in accordance with the key list.

In yet another embodiment, a first communication node, that is at least partially hardware, comprise a high latency processor component and a low latency processor component. The high latency processor component can be configured to communicate a security information set for a data set along a high latency communication channel with a second communication node. The low latency processor component can be configured to communicate the data set along a low latency communication channel with the second communication node. The high latency communication channel can function at a higher latency than the low latency communication channel

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
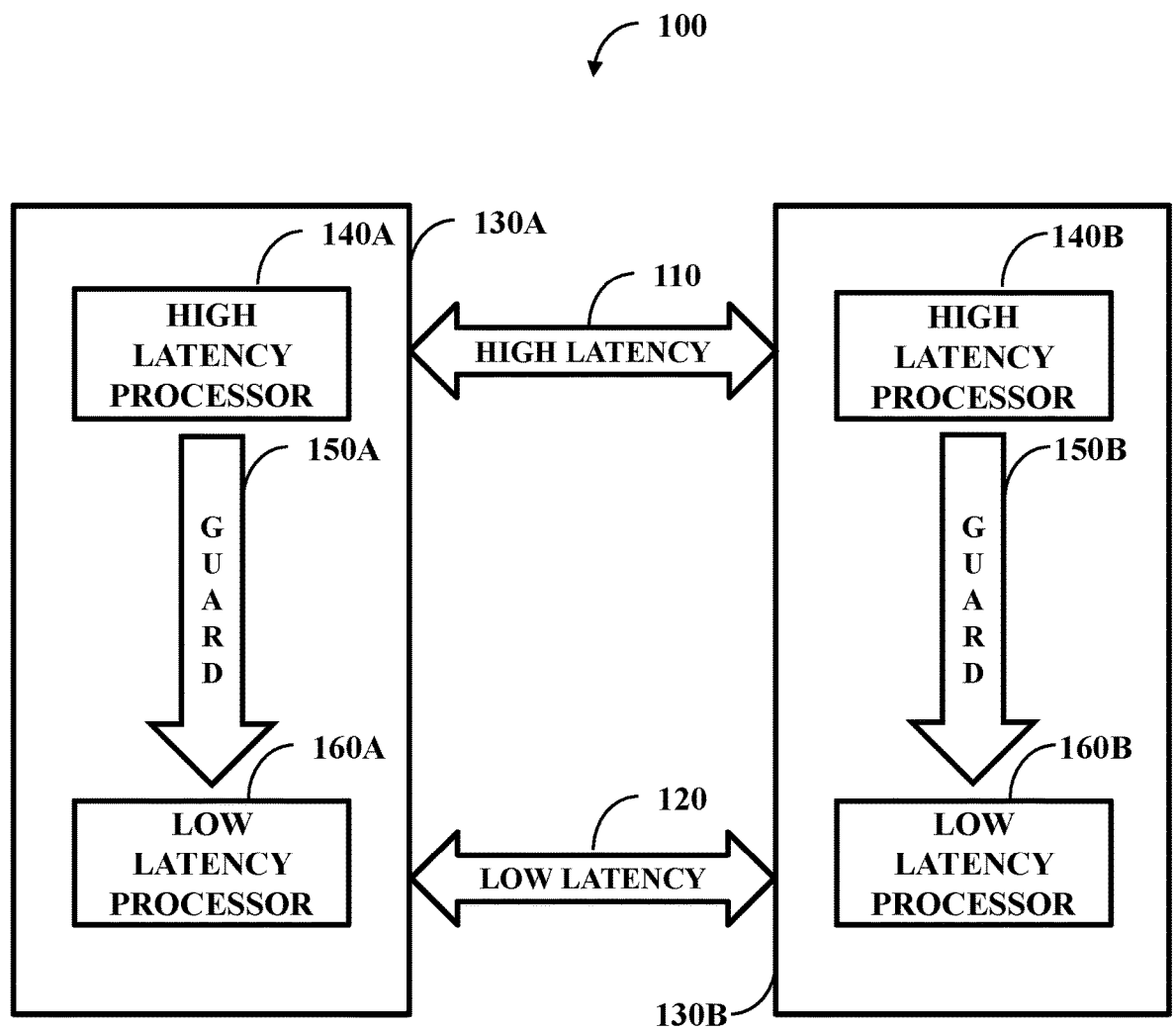
FIG. 1 illustrates one embodiment of a system that can employ two communication channels—a high latency channel and a low latency channel.

In discrete signaling, a processor can perform processing and cause something to occur elsewhere as a result of this processing by way of a message. This causation can be accomplished through use of a discrete signaling wire. However, if the processor is replaced, such as by a third-party processor, it can be challenging for the third-party processor to use the discrete signaling wire. Therefore, the discrete signaling wire can be replaced with an addressable bus.

One problem that can occur with replacement of the discrete signaling wire with the addressable bus is latency. Oftentimes, signals should be sent with very low latency (e.g., single digit microseconds). However, when security is added to this communication, latency levels can drastically increase. Therefore, signals that are beneficial to send with low latency are now communicated at high latency (e.g., milliseconds).

Example security that can be added includes information on who sends the message, an assurance that the message was not tampered with in transit, and encryption to stop an unintended party from reading the message (e.g., a third party monitoring a network upon which the message travels). In one example, it is undesirable for an outside party to send a message that is received or acted upon. While this security can be beneficial, it can be important that the message still be sent with low latency.

To do this, two communication channels can be used—the high latency communication channel and the low latency communication channel. A security information set for the message can be transmitted across the high latency channel (e.g., during down time). The message itself can be communicated along the low latency channel. This way, the message can still be communicated with low latency while being secure.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 that can employ two communication channels—a high latency channel 110 and a low latency channel 120. With these two channels 110 and 120, two nodes 130A and 130B can communicate with one another. The nodes 130A and 130B can include high latency processors 140A and 140B, respectively. The high latency processor 140A can perform tasks and pass information, by way of the guard 150A, to a low latency processor 160A. Similarly, the high latency processor 140B can perform tasks and pass information, by way of the guard 150B, to a low latency processor 160B. The high latency processors 140A and 140B can use the high latency channel 110 (e.g., implemented by way of a first addressable bus) to communicate with one another and the low latency processors 160A and 160B can use the low latency channel 120 (e.g., implemented by way of a second addressable bus) to communicate with one another.

In one example, the node 130A wants to communicate with the node 130B. A high latency processor 140A (a general purpose processor) generates a key list (a random binary sequence) and a sequence number list (which allows for determination of packet order). The key list can be a one-time use key list that is generated for a payload. The high latency processor 140A passes, by way of a guard 150A, the key list and the sequence number list to its low latency processor 160A (e.g., linear processor array). The high latency processor 140A can also pass the key list and the sequence number list, which together can be considered an example security information set, to the high latency processor 140B of node 130B by way of the high latency channel 110 (e.g., a secure channel using Transport Layer Security). The high latency processor 140B can pass, by way of the guard 150B, the key list and sequence number list to its processor 160B. From this, the node 130A and the node 130B have the key list and the sequence number list.

To transmit a payload from node 130A to node 130B, the low latency processor 160A can compute a hash of the payload. The hash (e.g., cyclic redundancy check) can be information that is based on the payload, but smaller than the payload. The hash can be appended to the payload to create an example of a data set. The key can be used to scramble the data set. The data set, in scrambled form, can be transmitted from node 130A to node 130B by way of the low latency channel 120 (e.g., an unsecured channel).

Node 130B can receive the data set and verify the hash to determine that the data set is not in a tampered state (e.g., tampered with while in transit from node 130A to node 130B). Further processing of the payload can occur at node 130B such that even if the data set is in a tampered state, the data set would not inappropriately impact an associated function.

Independent of network latency, latency as discussed above can be counted in clock cycles (e.g., one nanosecond). The low latency processors 160A and 160B can perform their tasks in a few clock cycles (e.g., five clock cycles for low latency processor 160A and five clock cycles for low latency processor 160B). One manner of reducing clock cycles can be choosing actions that can be run in parallel as opposed to sequentially. In one example, an algorithm used to produce the hash can be selected based on a number of parallel actions and/or a lack of sequential actions. Another manner can be selecting actions that take a minimal amount of time. In one example, scrambling the data set with the key can be done with an XOR action that takes a single clock cycle. Similarly, decoding the data set at the low latency processor 160B can take a single clock cycle.

While illustrated and discussed as being separate entities, the high latency processor 140A and the low latency processor 160A can be implemented as a single processor (as can the processors of node 130B). In one example, different logics can be implemented on one physical processor (e.g., a general purpose processor). Additionally, in one embodiment, components can be implemented as part of processors and nodes can function in transmission and reception capabilities depending on circumstances.

Figure 2:
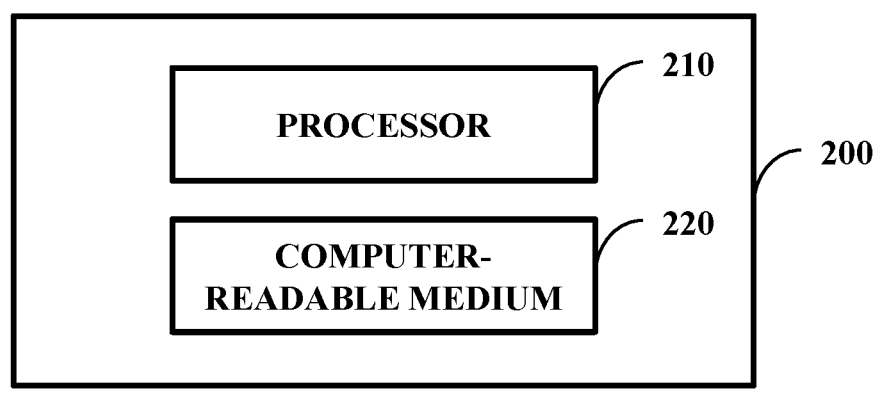
FIG. 2 illustrates one embodiment of a system comprising a processor and a computer-readable medium.

FIG. 2 illustrates one embodiment of a system 200 comprising a processor 210 (e.g., a processor as discussed in FIG. 1) and a computer-readable medium 220 (e.g., non-transitory computer-readable medium). In one embodiment, the computer-readable medium 220 is communicatively coupled to the processor 210 and stores a command set executable by the processor 210 to facilitate operation of at least one component disclosed herein (e.g., the high latency processor component). In one embodiment, at least one component disclosed herein (e.g., the low latency processor component) can be implemented, at least in part, by way of non-software, such as implemented as hardware by way of the system 200. In one embodiment, the computer-readable medium 220 is configured to store processor-executable instructions that when executed by the processor 210, cause the processor 210 to perform at least part of a method disclosed herein (e.g., at least part of one of the methods 300-1000 of FIGS. 3-10 discussed below).

Figure 3:
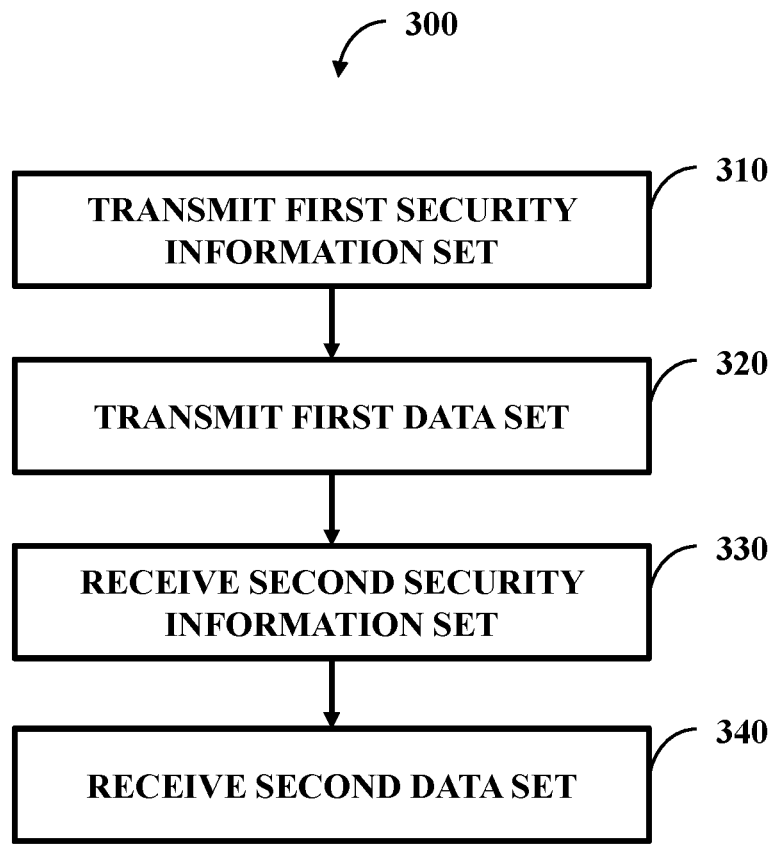
FIG. 3 illustrates one embodiment of a method comprising four actions.

FIG. 3 illustrates one embodiment of a method 300 comprising four actions 310-340. While the nodes 130A and 130B of FIG. 1, as well as their respective processors 140A, 140B, 160A and 160B of FIG. 1, are discussed in terms of node 130A of FIG. 1 transmitting and node 130B of FIG. 1 receiving, it is to be appreciated by one of ordinary skill in the art that the nodes 130A and 130B of FIG. 1 can individually function as transmitters and receivers (e.g., simultaneously). In one example, node 130A of FIG. 1 can transmit a first security information set at 310 to the node 130B of FIG. 1 and after this, transmit the first data set at 320 to the node 130B of FIG. 1. The node 130A of FIG. 1 can receive a second security information set (e.g., different from the first security information set) from a third node at 330 and then receive a second data set at 340. In this, the node 130A of FIG. 1 can perform both transmission and reception functions. Further, actions can occur concurrently. In one example, while the first data set is transmitted at 320 (e.g., by way of the low latency processor 160A of FIG. 1) the second security information set at 330 can be received.

Additionally, secure channel management can occur where a component manages an order for a plurality of nodes to use the high latency channel 110 of FIG. 1 to transfer their respective security information set. This management can include prioritization of communications. Also, management can include sending information to nodes so they know what to expect (e.g., the node 130B of FIG. 1 is told to expect a key list and sequence number list from the node 130A of FIG. 1).

Figure 4:
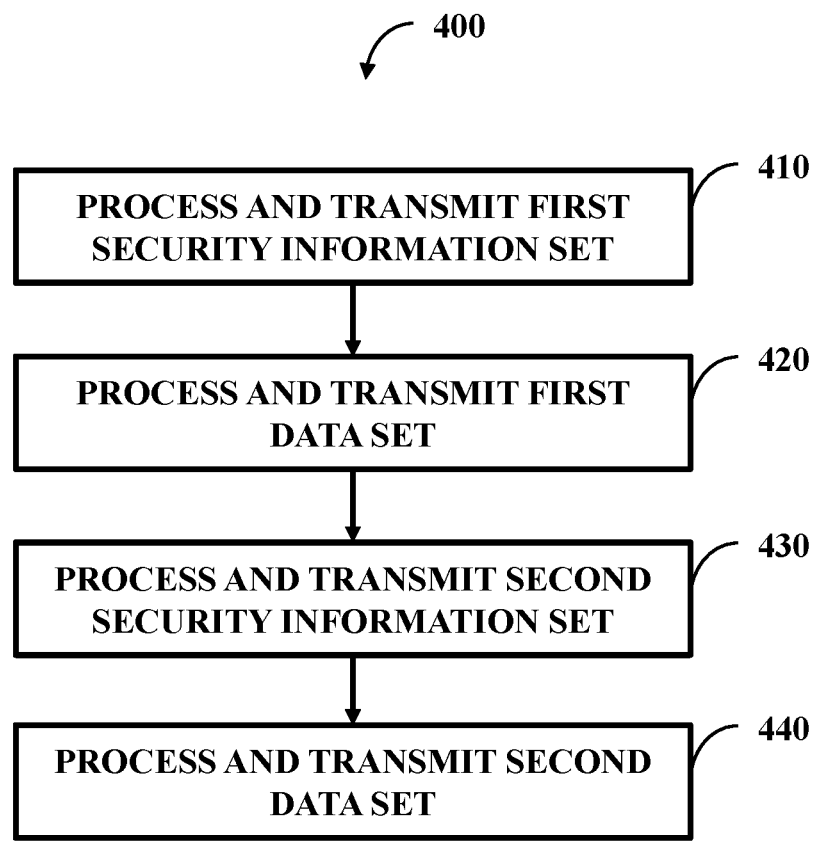
FIG. 4 illustrates one embodiment of a method comprising four actions.

FIG. 4 illustrates one embodiment of a method 400 comprising four actions 410-440. These four actions 410-440, in one embodiment, can be performed by a single node (e.g., node 130A of FIG. 1). At 410, a first security information set can be processed (e.g., generated) and transmitted and, at 420, a first data set can be processed (e.g., encrypted) and transmitted. At 430, a second security information set can be processed (e.g., generated) and transmitted and, at 440, a second data set can be processed (e.g., encrypted) and transmitted.

At least some actions disclosed herein can occur concurrently. In one example, transmission of the first data set at 420 can occur at the same time as transmission of the second security information set at 430. To put another way, two communications can be worked concurrently such that both channels are used and therefore a combined time for communication is lessened. Therefore, the channels 110 and 120 of FIG. 1 can be used at the same time and more efficient communication can occur.

Figure 5:
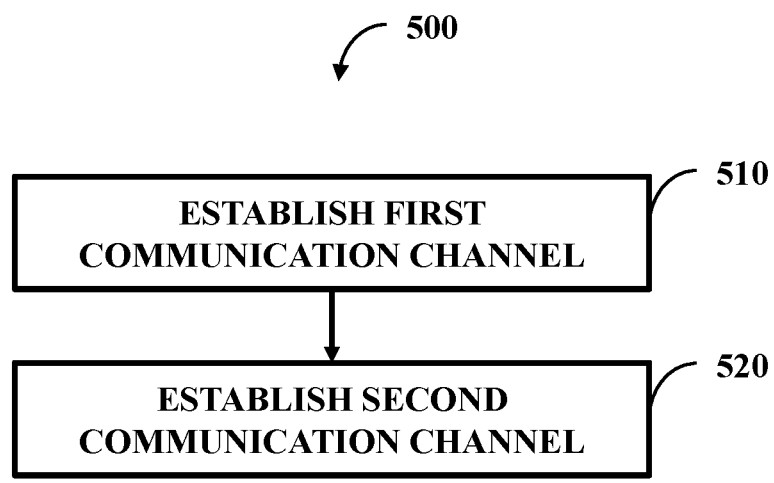
FIG. 5 illustrates one embodiment of a method comprising two actions.

FIG. 5 illustrates one embodiment of a method 500 comprising two actions. At 510, there is establishing a first communication channel suitable to communicate the security information set at a first latency level. At 520, there is establishing a second communication channel suitable to communicate the data set at a second latency level (lower that the first latency level). Establishing these channels can comprise identifying a suitable conduit (e.g., based on hardware capabilities of the conduit) and determining other usage of the conduit (e.g., by other system entities).

A system can function and be modular in operation. By being modular, different modules can enter and exit the system (e.g., interface or de-interface with the system). When a new module enters the system, the module and/or the system can establish a communication link with the system (e.g., with a master node of the system). The communication link can include establishing the first communication channel (e.g., high latency channel 110 of FIG. 1) and the second communication channel (e.g., low latency channel 120 of FIG. 1).

Figure 6:
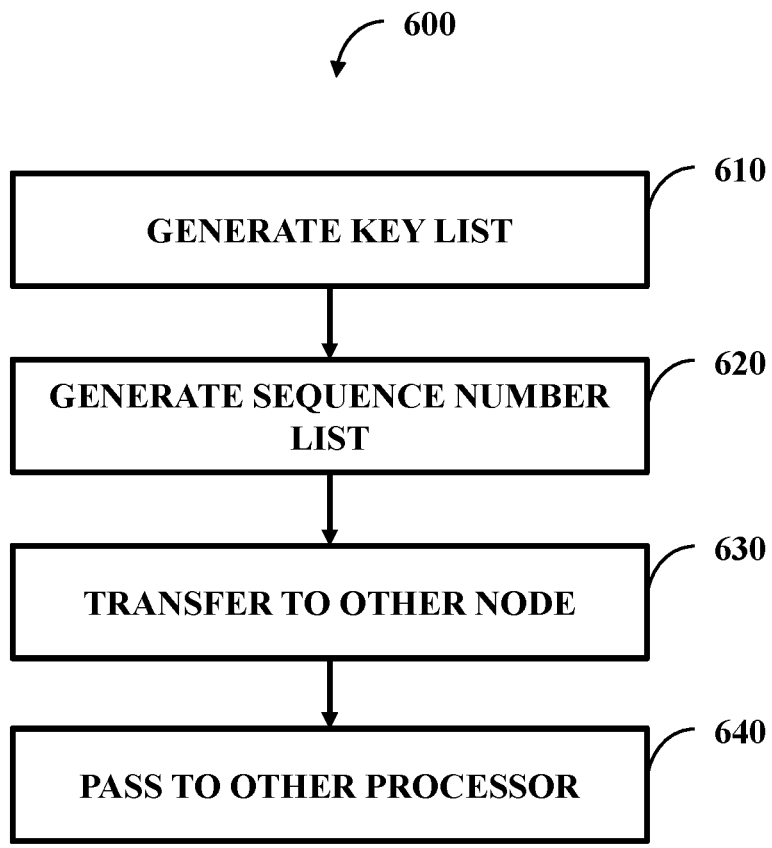
FIG. 6 illustrates one embodiment of a method comprising four actions.

FIG. 6 illustrates one embodiment of a method 600 comprising four actions 610-640. At 610, a key list can be generated for a payload. At 620, generating a sequence number list for the payload can occur. The sequence number list can identify the order for the payload, such as if the payload is sent in packets, but not received in the order sent, then a receiver can properly order the packets. The key list and/or the sequence number list, at 630, can be caused to be sent to a second communication node (e.g., node 130B of FIG. 1) along a first communication channel (e.g., channel 110 of FIG. 1) with a first security level (e.g., secured).

Actions 610-630 can be performed by a first processor (e.g., high latency processor 140A of FIG. 1). Action 640 can also be performed by the first processor. At 640, passing the key list for the payload to a second processor (e.g., to the low latency processor 160A by way of the guard 150A) can take place.

Figure 7:
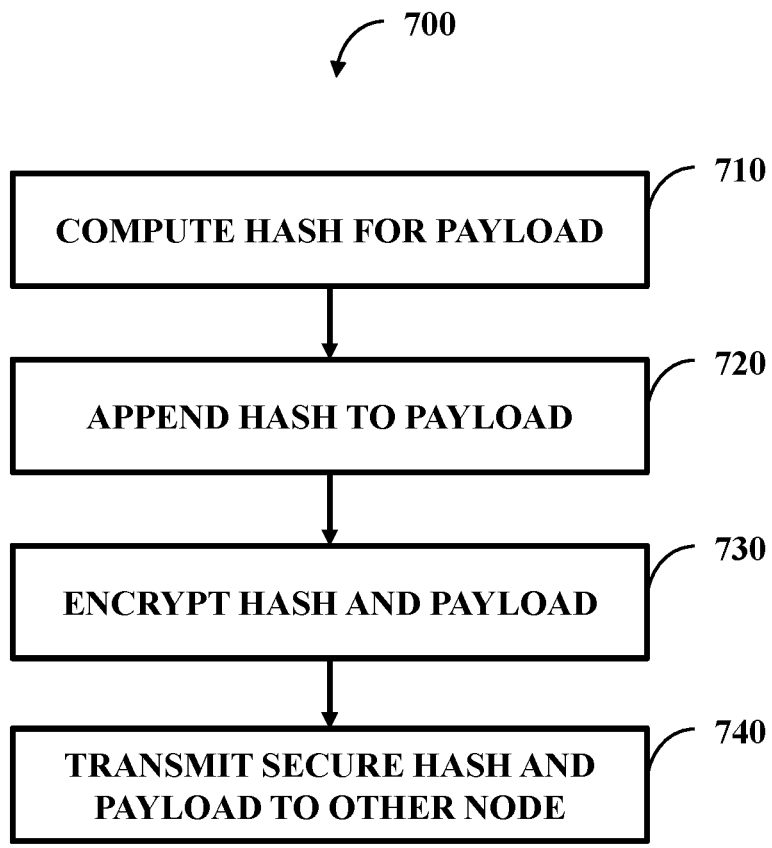
FIG. 7 illustrates one embodiment of a method comprising four actions.

FIG. 7 illustrates one embodiment of a method 700 comprising four actions 710-740 that can be performed by the second processor. At 710, computing a hash for the payload can take place. The hash can be appended to the payload at 720 such that the data set comprises the hash. At 730, encrypting the data set in accordance with the key list can occur. At 740, causing the encrypted data set to be sent to the second communication node along the second communication channel with the second security level (e.g., unsecured) can take place.

Figure 8:
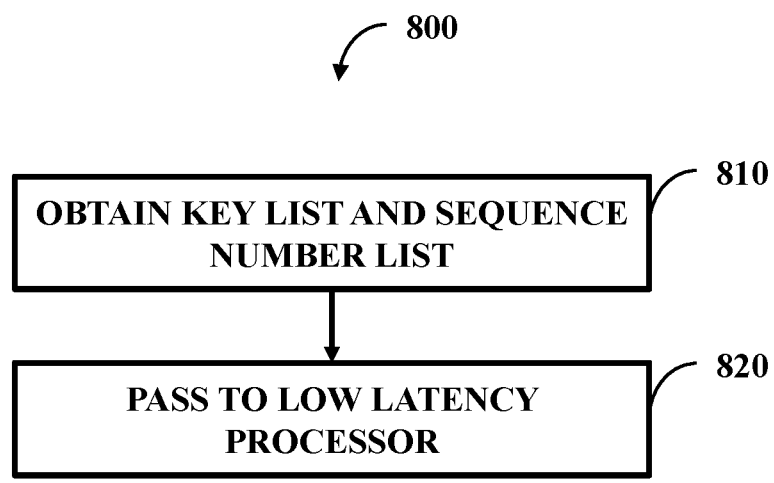
FIG. 8 illustrates one embodiment of a method comprising two actions.

FIG. 8 illustrates one embodiment of a method 800 comprising two actions 810-820. At 810, the key list and sequence number list can be obtained (e.g., at node 130B of FIG. 1 from node 130A of FIG. 1, such as by the high latency processor 140B). The key list and sequence number can, at 820, be passed to the low latency processor 160B of FIG. 1.

Figure 9:
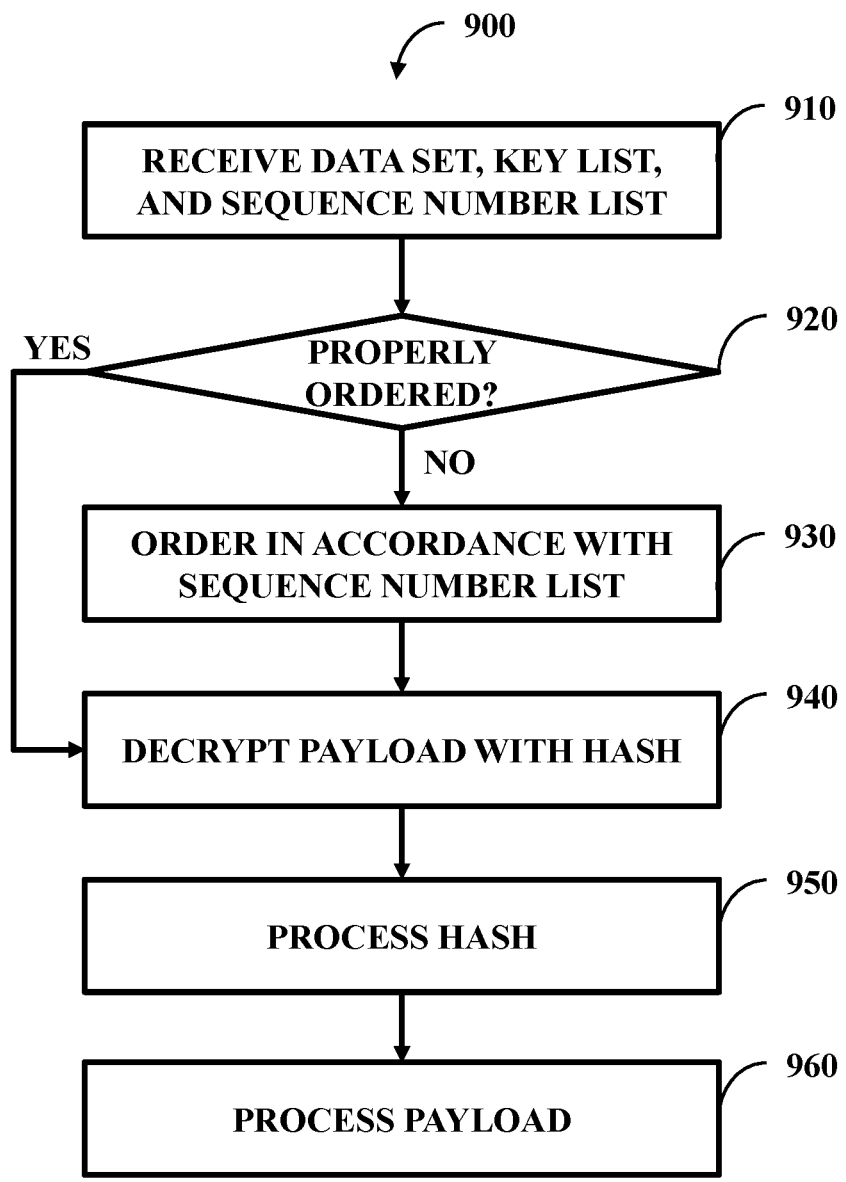
FIG. 9 illustrates one embodiment of a method comprising six actions.

FIG. 9 illustrates one embodiment of a method 900 comprising six actions 910-960. At 910, receiving the payload and the hash by way of a low latency communication channel (e.g., the low latency channel 120 of FIG. 1) can take place (e.g., can take place at the low latency processor 160B of FIG. 1). Also at 910, receiving (e.g., from the high latency processor 140B of FIG. 1) the key list and the sequence number list for the payload can take place. At 920, a check can occur ensuring that the payload is properly ordered in accordance with the sequence number list. As part of this ensuring, if the payload is not properly ordered, then reordering can take place at 930.

At 940, decrypting a payload and a hash can take place by way of the key list. At 950, performing a verification of the data set by way of a hash can occur. This can include computing the hash and comparing the hash with a predetermined hash (e.g., received at action 910 or computed with an algorithm that matches an algorithm of the node 130A of FIG. 1) to verify that the payload has not been tampered with in transit.

The payload can be an instruction to do something (e.g., fire a weapon). At 960, processing the payload can occur, such as reading an instruction (e.g., the payload) of the data set. When the verification of the hash is successful, then the instruction can be followed (e.g., fire the weapon). When the verification is not successful, then the instruction can be ignored (e.g., not fire the weapon). Other actions can occur, such as logging the failed payload and analyzing the failed payload to determine how it was tampered with or logging the channel that facilitated the tampering.

Figure 10:
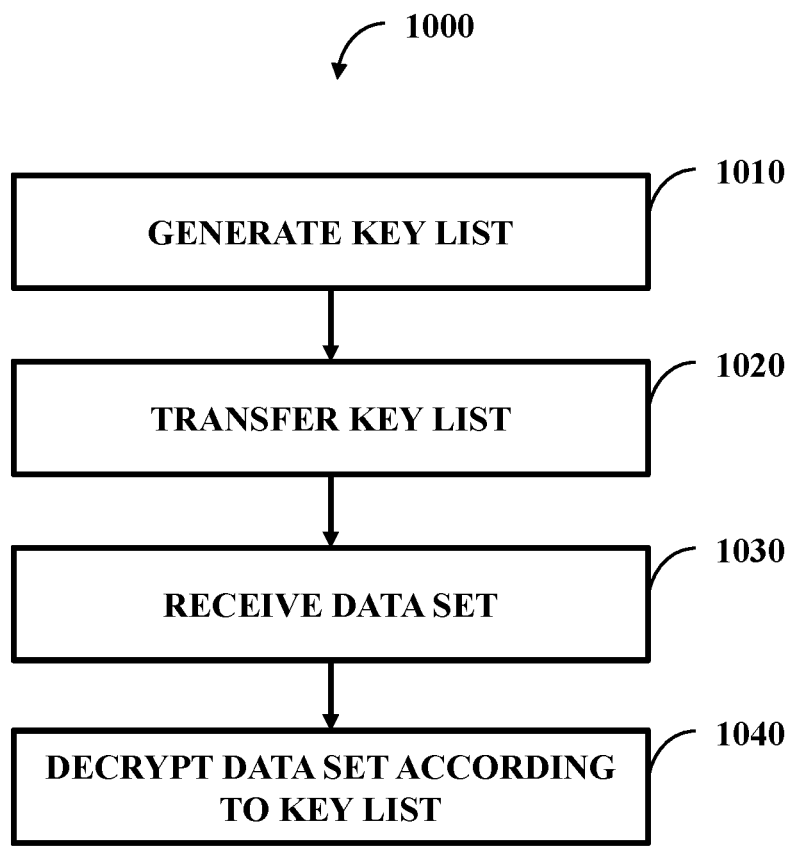
FIG. 10 illustrates one embodiment of a method comprising four actions.

FIG. 10 illustrates one embodiment of a method 1000 comprising four actions 1010-1040. With the method 1000, a node (e.g., the node 130B of FIG. 1) that receives and uses the data set can also generate the key list. At 1010, a key list is generated. At 1020, the key list is transferred from the node 130B of FIG. 1, along the high latency channel 110 of FIG. 1, to the node 130A of FIG. 1 as well as passed to the low latency processor 160B of FIG. 1. The node 130A of FIG. 1 can encrypt the data set and send the data set along the low latency channel 120 of FIG. 1. The low latency processor 160B of FIG. 1 can receive the data set at 1030 and decrypt the data set according to the key list at 1040. Determination on what node and/or what high latency processor generates the key list can be made by various entities depending on architecture. Examples of this can include a resource management component that identifies an available high latency processor (e.g., a high latency processor that is on a third node that does not receive or transmit the data set) or if the nodes have a master-slave relationship (e.g., the master node creates or the master node dictates what node creates) and/or a client-service relationship (e.g., a node providing a service is subservient to a node requesting and/or benefitting from the service). In one embodiment, master-slave relationships among nodes can change over time.

While the methods disclosed herein are shown and described as a series of blocks, it is to be appreciated by one of ordinary skill in the art that the methods are not restricted by the order of the blocks, as some blocks can take place in different orders. In one example, the check 920 of FIG. 9 can occur after the payload is decrypted at 940 of FIG. 9. Similarly, a block can operate concurrently with at least one other block. In one example, actions 320 and 330 of FIG. 3 can occur, at least in part, simultaneously.

What is claimed is:

1. A first communication node, that is as least partially hardware, comprising:

a high latency processor component configured to communicate a security information set for a data set along a high latency communication channel with a second communication node; and a low latency processor component configured to communicate the data set along a low latency communication channel with the second communication node, where the high latency communication channel functions at a higher latency than the low latency communication channel, where the security information set is a first security information set, where the data set is a first data set, where the high latency processor component is configured to transmit the first security information set for the first data set along the high latency communication channel to the second communication node, where the low latency processor component is configured to transmit the first data set along the low latency communication channel to the second communication node, where the high latency processor component is configured to receive a second security information set for a second data set along the high latency communication channel from the second communication node, where the low latency processor component is configured to receive the second data set along the low latency communication channel from the second communication node, where the first security information set and the second security information set are not identical, where the first data set and the second data set are not identical, where the high latency processor component is configured to transmit the first security information set for the first data set along the high latency communication channel to the second communication node concurrently with reception of the second security information set for the second data set along the high latency communication channel from the second communication node and where the low latency processor component is configured to transmit the first data set along the low latency communication channel to the second communication node concurrently with reception of the second data set along the low latency communication channel from the second communication node.

* * * * *